(12) United States Patent
Harik

(10) Patent No.: US 7,647,299 B2
(45) Date of Patent: Jan. 12, 2010

(54) SERVING ADVERTISEMENTS USING A SEARCH OF ADVERTISER WEB INFORMATION

(75) Inventor: Georges R. Harik, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 777 days.

(21) Appl. No.: 10/614,736

(22) Filed: Jun. 30, 2003

(65) Prior Publication Data

US 2004/0267725 A1    Dec. 30, 2004

(51) Int. Cl.
*G06F 17/30* (2006.01)
(52) U.S. Cl. .............................. 707/3; 707/102; 705/14
(58) Field of Classification Search .................. 707/1–7, 707/9, 10, 100–104.1, 200, 203, 102; 705/1, 705/14, 26, 27; 709/200–204, 217–219, 709/223–229; 713/200, 201; 715/500, 501.1, 715/513–517, 526, 700, 723, 733, 738, 760, 715/764, 810, 848, 853, 854, 866, 965–968; 345/418, 473
See application file for complete search history.

(56) References Cited

U.S. PATENT DOCUMENTS

| | | | |
|---|---|---|---|
| 5,724,521 A | | 3/1998 | Dedrick |
| 5,740,549 A | | 4/1998 | Reilly et al. |
| 5,848,397 A | | 12/1998 | Marsh et al. |
| 5,915,249 A | * | 6/1999 | Spencer .......................... 707/5 |
| 5,948,061 A | | 9/1999 | Merriman |
| 6,026,368 A | | 2/2000 | Brown et al. |
| 6,044,376 A | | 3/2000 | Kurtzman, II |
| 6,078,914 A | | 6/2000 | Redfern |
| 6,119,101 A | * | 9/2000 | Peckover ...................... 705/26 |
| 6,144,944 A | | 11/2000 | Kurtzman, II et al. |
| 6,167,382 A | | 12/2000 | Sparks et al. |

(Continued)

FOREIGN PATENT DOCUMENTS

WO    WO 97/21183    6/1997

(Continued)

OTHER PUBLICATIONS

Amit Singhal and Marcin Kaszkiel, "Tivra", AT&T at TREC-9, 1999, pp. 1-3.*

(Continued)

*Primary Examiner*—Debbie M Le
(74) *Attorney, Agent, or Firm*—Straub & Pokotylo; John C. Pokotylo

(57) ABSTRACT

Advertisers are permitted to put targeted ads on, or to serve ads in association with, various content such as search results pages, Web pages, e-mail, etc., without requiring the advertiser to enter and/or maintain certain targeting information, such as keyword targeting. This may be accomplished by using a searchable data structure, such as an inverted index for example, of available advertiser Web information. The advertiser Web information may include terms and/or phrase extracted from the advertiser's Website. In particular, a search query may be used to search for matching advertisers, and therefore matching ads. For example, the search query can be used to search an inverted index including words and/or phrases extracted from advertiser Websites. The advertiser Web page, or some other identifier, can be used as a key to search for an associated ad.

32 Claims, 6 Drawing Sheets

U.S. PATENT DOCUMENTS

| | | | |
|---|---|---|---|
| 6,269,361 B1 | 7/2001 | Davis et al. | |
| 6,401,075 B1 | 6/2002 | Mason et al. | |
| 6,408,294 B1 | 6/2002 | Getchius et al. | |
| 6,480,843 B2* | 11/2002 | Li | 707/5 |
| 6,519,571 B1* | 2/2003 | Guheen et al. | 705/14 |
| 6,876,997 B1* | 4/2005 | Rorex et al. | 707/3 |
| 6,985,882 B1 | 1/2006 | Del Sesto | |
| 7,007,074 B2* | 2/2006 | Radwin | 709/217 |
| 7,039,599 B2 | 5/2006 | Merriman et al. | |
| 7,043,471 B2* | 5/2006 | Cheung et al. | 707/3 |
| 7,136,875 B2 | 11/2006 | Anderson et al. | |
| 7,225,182 B2* | 5/2007 | Paine et al. | 707/3 |
| 7,275,063 B2* | 9/2007 | Horn | 707/102 |

FOREIGN PATENT DOCUMENTS

| | | |
|---|---|---|
| WO | WO 01/80075 | 10/2001 |

OTHER PUBLICATIONS

Krishna Bharat and George A. Mihaila, "When Experts Agree: Using Non-Affiliated Experts to Rank Popular Topics", May 2001 pp. 597-602.p.*

Budi Yuwono, Savio L. Lam, Jerry H. Ying, Dik L. Lee, "A World Wide Web Resource Discovery System", Department of Computer Science, Hong Kong University of Science and Technology, 1995, pp. 1-6.*

Brian D. Davidson, "Topical Locality in the Web", Department of Computer Science, Rutgers, State University of New Jersey, 2000, pp. 1-8.*

Gergen, Peter, *Internetdienste*, pp. 289-305, 2002, Addison-Wesley, München, XP002405172, ISBN 3-8273-1926-9

EPO form 1507.4, "Communication" for EP 04756464.6, mailed Nov. 20, 2006 (1 pg.).

EPO Form 1503, "Supplementary European Search Report" for EP 04756464.6, mailed Nov. 20, 2006 (1 pg.).

PCT/ISA/220, Notification of Transmittal of the International Search Report or the Declaration for PCT/US04/21087, mailed May 27, 2005 (1 pg.).

PCT/ISA/210, "International Search Report" for PCT/US04/21087, mailed May 27, 2005 (5 pgs.).

PCT/ISA/237, "Written Opinion of the International Searching Authority" for PCT/US04/21087, mailed May 27, 2005 (6 pgs.).

EPO Communication for Application 04756464.6-1238, mailed Jul. 23, 2007 (4 pgs.).

Chinese Office Action for Chinese Patent Application No. 2004800242607, mailed on Nov. 23, 2007 (8 pgs.) (with English Translation (8 pgs.)).

Notice of Preliminary Rejection for Korean Patent Application No. 10-2005-7025449, mailed Nov. 25, 2008 (6 pgs.) with translation (7 pgs.).

Canadian Office Action for Canadian Patent Application No. 2,530,400, mailed Nov. 27, 2008 (4 pgs.).

Notification of Second Office Action for Chinese Patent Application No. 200480024260.7, mailed on May 16, 2008 (4 pgs.) (with English translation (5 pgs.).

U.S. Appl. No. 95/001,073, filed Jul. 30, 2008, Reexamination of Stone et al.

U.S. Appl. No. 95/001,061, filed Jul. 7, 2008, Reexamination of Stone et al.

U.S. Appl. No. 95/001,069, filed Jul. 21, 2008, Reexamination of Stone et al.

U.S. Appl. No. 95/001,068, filed Jul. 14, 2008, Reexamination of Stone et al.

Dedrick, R., Interactive Electronic Advertising, IEEE, 1994.

Dedrick, R., A Consumption Model for Targeted Electronic Advertising, Intel Architecture Labs, IEEE, 1995.

Baseview Products, Inc., ClassManagerPro Administration Manual v. 1.0.5, Feb. 1, 1997.

Ad-Star.com website archive from www. Archive.org, Apr. 12, 1997 and Feb. 1, 1997.

Information Access Technologies, Inc., Aaddzz brochure, "The Best Way to Buy and Sell Web Advertising Space," © 1997.

Information Access Technologies, Inc., Aaddzz.com website archive from www.Archive.org, archived on Jan. 30, 1998.

AdKnowledge Market Match Planner: Reviewer's Guide, AdKnowledge, May 1998.

AdKnowledge Campaign Manager: Reviewer's Guide, AdKnowledge, Aug. 1998.

Baseview Products, Inc., AdManagerPro Administration Manual v. 2.0, Dec. 1998.

AdForce, Inc., A Complete Guide to AdForce, Version 2.6, 1998.

AdForce, Inc., S-1/A SEC Filing, May 6, 1999.

Business Wire, "Global Network, Inc. Enters Into Agreement in Principle With Major Advertising Agency," Oct. 4, 1999.

Zeff, R. et al., *Advertising on the Internet*, $2^{nd}$ Ed., John Wiley & Sons, 1999.

Request for Reexamination of U.S. Patent No. 7,240,025 B2, U.S. Appl. No. 95/001,073.

Request for Reexamination of U.S. Patent No. 6,446,045 B1, U.S. Appl. No. 95/001,061.

Request for Reexamination of U.S. Patent No. 7,249,059 B2, U.S. Appl. No. 95/001,069.

Request for Reexamination of U.S. Patent No. 6,829,587 B2, U.S. Appl. No. 95/001,068.

Statement Regarding References in 1449 Form.

Notice of Reasons for Rejection for Japanese Patent Application No. 2006-517812, mailed Mar. 31, 2009 (5 pgs.) with translation (6 pgs.).

Re-Examination Report for Korean Patent Application No. 10-2005-7025449, mailed Jul. 8, 2009 (2 pgs.) with translation (2 pgs.).

* cited by examiner

SERVING ADVERTISEMENTS USING A SEARCH OF ADVERTISER WEB INFORMATION

§ 1. BACKGROUND OF THE INVENTION

§ 1.1 Field of the Invention

The present invention concerns advertising. In particular, the present invention concerns the targeted serving of ads.

§ 1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site. An advertiser will normally determine such targeting manually.

In addition, recently an industry of "search engine optimization" has emerged, in which parties commonly referred to as search engine optimizers ("SEOs") offer their services to help owners of online content (including online advertisers) make their Websites more visible or prominent in the search results returned by Internet search engines.

Web site-based ads (also referred to as "Web ads") are typically presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Web site-based advertisement, there remain several problems with existing approaches. Although advertisers are able to reach a large audience, they are frequently dissatisfied with the return on their advertisement investment.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com", which hosts a so-called "search engine" service returning advertisements masquerading as "search results" in response to user queries. The Overture.com web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Some search engines seek to increase revenues by offering "paid inclusion" to Website owners. With paid inclusion, Websites may pay a fee to the search engine to ensure that the Website is included in the list of sites/properties indexed/surveyed/returned by the search engine in response to a user query (and/or to increase the frequency with which the search engine surveys/crawls the web site). Typically, search engines include/mix Websites determined under paid inclusion with other Websites that they determine independent of paid inclusion. However, this can degrade the end user (searcher) search experience because the search results returned for a user search or query may not contain the most relevant search results and/or in the most relevant order.

Some search engines, such as Google for example, have enabled advertisers to target their ads so that they will be rendered with a search results page and so that they will be relevant, presumably, to the query that prompted the search results page. Although search result pages afford advertisers a great opportunity to target their ads to a more receptive audience, they typically require advertisers to enter targeting information, such as keyword targeting information. Some advertisers may find entering and/or maintaining keyword targeting information difficult, or at least tedious. For example, if an advertiser sells many different products, and their product offerings are subject to frequent changes, they may find it extremely time consuming to enter and maintain keyword targeting information. Moreover, some advertisers may have trouble selecting the right keywords to maximize the performance of their ads. Other targeted advertising systems, such as those that target ads based on e-mail information (See, e.g., the systems described in U.S. patent application Ser. No. 10/452,830 (incorporated herein by reference), entitled "SERVING ADVERTISEMENTS USING INFORMATION ASSOCIATED WITH E-MAIL", filed on Jun. 2, 2003 and listing Jeffrey A. Dean, Georges R. Harik and Paul Bucheit); or those that target ads based on content (See, e.g., U.S. patent application Ser. No. 10/375,900 (incorporated herein by reference), entitled "SERVING ADVERTISEMENTS BASED ON CONTENT", filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar) may have similar challenges.

Thus, it would be useful to allow owners of web content to target ads and/or to advertise their products and services without requiring them to enter and/or maintain certain targeting information, such as keywords for example.

§ 2. SUMMARY OF THE INVENTION

The present invention allows advertisers to put targeted ads on, or to serve ads in association with, various content such as search results pages, Web pages, e-mail, etc., without requiring the advertiser to enter and/or maintain certain targeting information, such as keyword targeting. The present invention may do so by using a searchable data structure (e.g., an inverted index) of available advertiser information (e.g., terms and/or phrases extracted from the advertiser's Website). In particular, the present invention may accept or generate a search query, and use the search query to search matching advertiser Web pages, and therefore matching ads. In one embodiment, the search query can be used to search an inverted index including words and/or phrases extracted from advertiser Websites. The URL of an advertiser Website or Web page, or some other identifier, can be used as a key to search for an associated ad. Although the present invention does not require explicitly entered keyword targeting information, it can either ignore, or be used in conjunction with, such information if it exists.

§ 3. BRIEF DESCRIPTION OF THE DRAWINGS

§ 4. DETAILED DESCRIPTION

The present invention may involve novel methods, apparatus, message formats and/or data structures for allowing advertisers to put targeted ads on, or to serve ads in association with, various content (such as search results pages, Web pages, e-mail, etc.) without requiring the advertiser to enter and/or maintain certain targeting information, such as keyword targeting. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in § 4.1. Then, exemplary embodiments of the present invention are described in § 4.2. Examples of operations are provided in § 4.3. Finally, some conclusions regarding the present invention are set forth in § 4.4.

§ 4.1 Environments in which, or with which, the Present Invention May Operate

§ 4.1.1 Exemplary Advertising Environment

Figure 1:
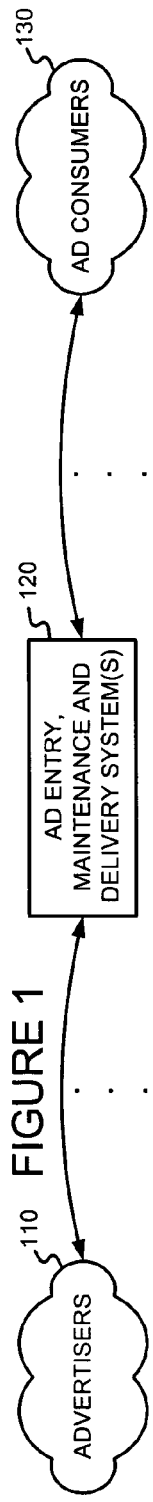
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for documents (e.g., articles, discussion threads, music, video, graphics, search results, Web page listings, etc.), and retrieves the requested document in response to, or otherwise services, the request. The content server may submit a request for ads to the system 120. Such an ad request may include a number of ads desired. The ad request may also include document request information. This information may include the document itself (e.g., page), a category corresponding to the content of the document or the document request (e.g., arts, business, computers, arts-movies, arts-music, etc.), part or all of the document request, content age, content type (e.g., text, graphics, video, audio, mixed media, etc.), geolocation information, etc.

The content server may combine the requested document with one or more of the advertisements provided by the system 120. This combined information including the document content and advertisement(s) is then forwarded towards the end user that requested the document, for presentation to the user. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, feature vectors of identified documents, etc.

The search engine may combine the search results with one or more of the advertisements provided by the system 120. This combined information including the search results and advertisement(s) is then forwarded towards the user that submitted the search, for presentation to the user. Preferably, the search results are maintained as distinct from the ads, so as not to confuse the user between paid advertisements and presumably neutral search results. For example, the ads may have a different formatting (e.g., shape, style, font, size, etc.) than the search results. Alternatively, or in addition, the search results may be rendered in a first contiguous portion of a document, while the ads may be rendered in a second contiguous portion of the document (where the first and second portions don't overlap).

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

As can be appreciated from the foregoing, an ad entry, maintenance and delivery system(s) 120 may serve ad consumers 130 such as content servers and search engines. As discussed in § 1.2 above, the serving of ads targeted to the search results page generated by a search engine is known. As discussed in U.S. Patent Application Ser. No. U.S. patent application Ser. No. 10/375,900, entitled "SERVING ADVERTISEMENTS BASED ON CONTENT", filed on Feb. 26, 2003 and listing Darrell Anderson, Paul Bucheit, Alex Carobus, Claire Cui, Jeffrey A. Dean, Georges R. Harik, Deepak Jindal and Narayanan Shivakumar as inventors, ads targeted to documents served by content servers may also be served. For example, referring to the exemplary environment of FIG. 3, a network or inter-network 360 may include an ad server 320 serving targeted ads in response to requests from a search engine 332 with ad spots for sale. Suppose that the inter-network 350 is the Web. The search engine 332 crawls much or all of the content 350. Some 334 of this content 350 will include ad spots (also referred to as "inventory") available. More specifically, one or more content servers 336 may include one or more documents 340. Even if the document does not include explicitly defined available ad spots, it may be determined that ads can be served in, or in association with (e.g., in a window in the foreground above the document (referred to as a "pop-up window"), in the background under the document (referred to as a "pop-under window"), etc.) the document. The ad may partly or totally obscure the document, share the screen space with the document, take screen space from the document, be partly or totally obscured by the document, etc.

Figure 3:
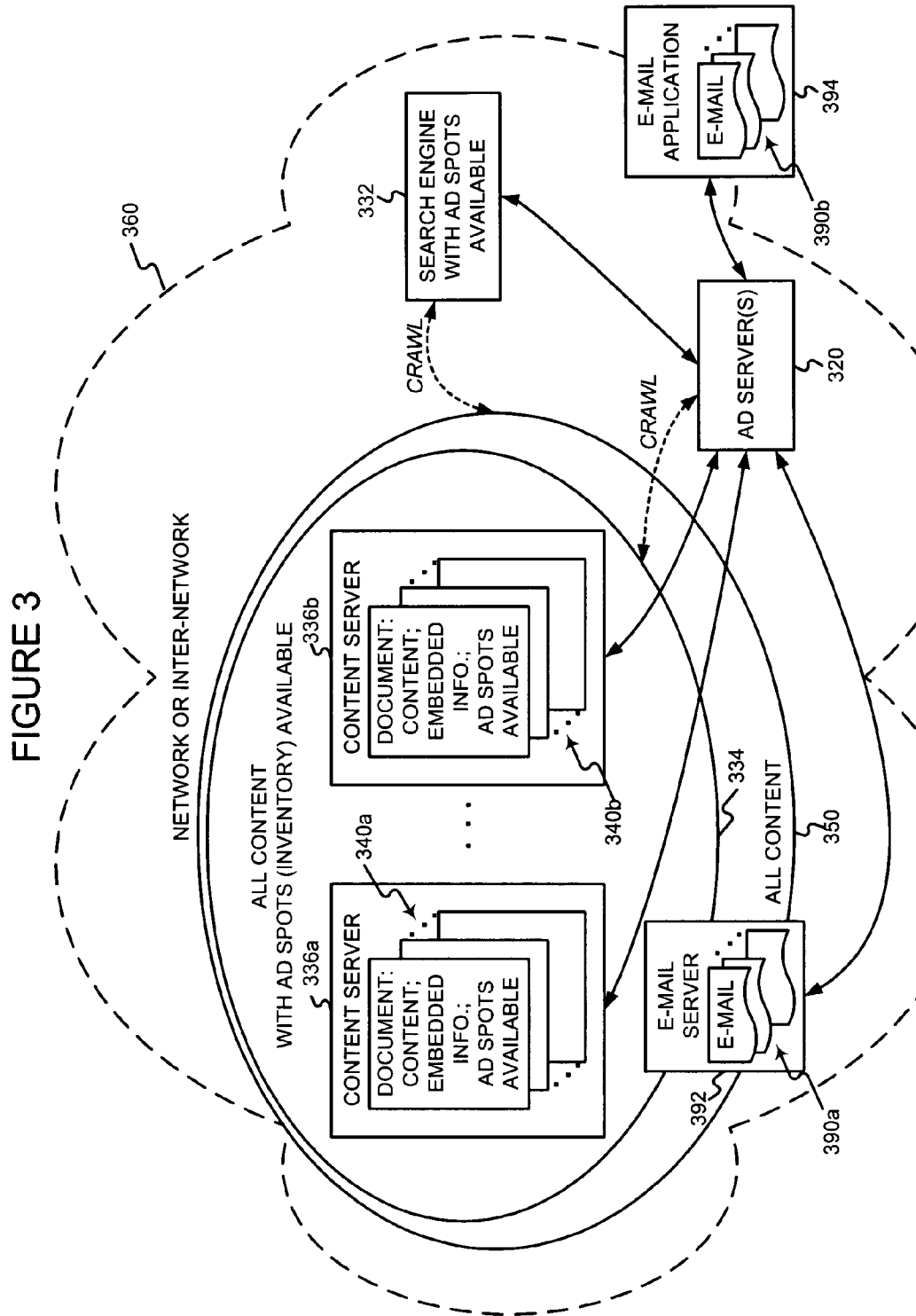
FIG. 3 illustrates an environment in which advertisers can target their ads on search results pages generated by a search engine, documents served by content servers, and/or e-mail.

Still referring to FIG. 3, an e-mail server 392 (such as Microsoft Network (MSN) HotMail, Yahoo Mail, etc., for example) may be thought of, generally, as a content server in which a document served is simply an e-mail 390a. Further, e-mail applications 394 (such as Microsoft Outlook for example) may be used to send and/or receive e-mail 390b. Therefore, referring to both FIGS. 1 and 3, an e-mail server 392 or application 394 may be thought of as an ad consumer 130. Thus, e-mails 390 may be thought of as documents, and targeted ads may be served in association with such documents. For example, one or more ads may be served in, under, over, or otherwise in association with an e-mail. Although some e-mail servers, such as Yahoo Mail for example, serve ads in e-mails, these ads are not targeted and therefore will not perform as well (e.g., in terms of user selection) as targeted ads.

§ 4.1.2 Exemplary Ad Entry, Maintenance and Delivery Environment

Figure 2:
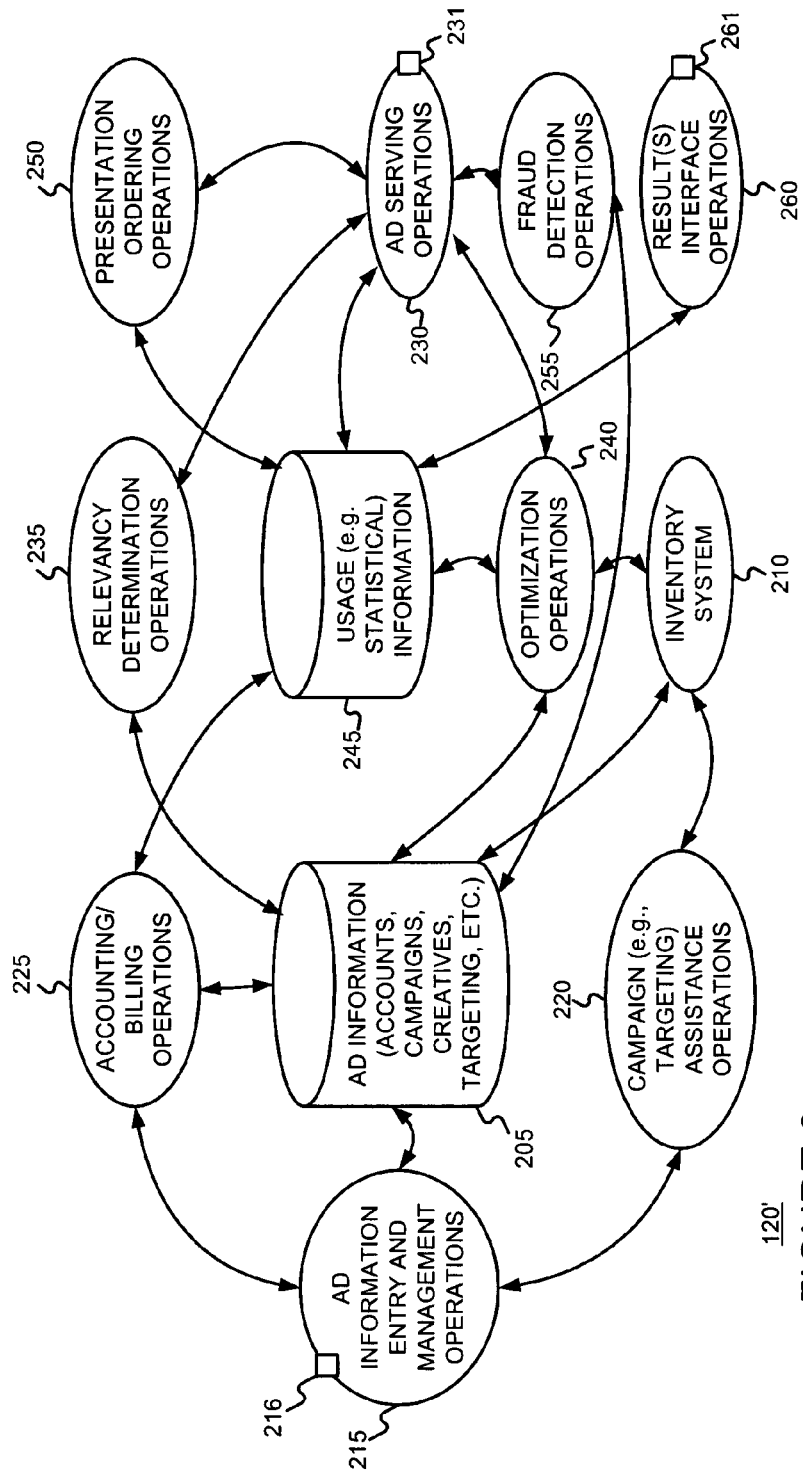
FIG. 2 is a bubble chart of an exemplary advertising environment in which, or with which, the present invention may operate.

FIG. 2 illustrates an exemplary ad system 120' with which the present invention may be used. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include targeting information (e.g., a set of keywords), and a maximum cost (cost per click-though, cost per conversion, etc.) though, as alluded to above, the present invention obviates the need for the advertiser to enter targeting keywords. Alternatively, or in addition, each ad group may include an average cost (e.g., average cost per click-through, average cost per conversion, etc.). Therefore, a single maximum cost and/or a single average cost may be associated with one or more keywords. As stated, each ad group may have one or more ads or "creatives" (That is, ad content that is ultimately rendered to an end user.). Each ad may also include a link to a URL (e.g., a landing Web page, such as the home page of an advertiser, or a Webpage associated with a particular product or server). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. The ad serving operations 230 may then use relative presentation attribute assignment operations 250 to order the presentation of the ads to be returned. The accounting/billing operations 225 may be used to track charges related to the serving of advertisements and to bill advertisers. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

§ 4.1.3 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geographic location, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases, though, as alluded to above, the present invention obviates the need for an advertiser to enter targeting keywords. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc.; the files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information, such as that described in U.S. patent application Ser. No. 10/452,791, entitled "SERVING ADVERTISEMENTS USING USER REQUEST INFORMATION AND USER INFORMATION," filed on the Jun. 2, 2003, and listing Steve Lawrence, Mehran Sahami and Amit Singhal as inventors. This application is incorporated herein by reference.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in § 4.2.

§ 4.2 Exemplary Embodiments

Figure 4:
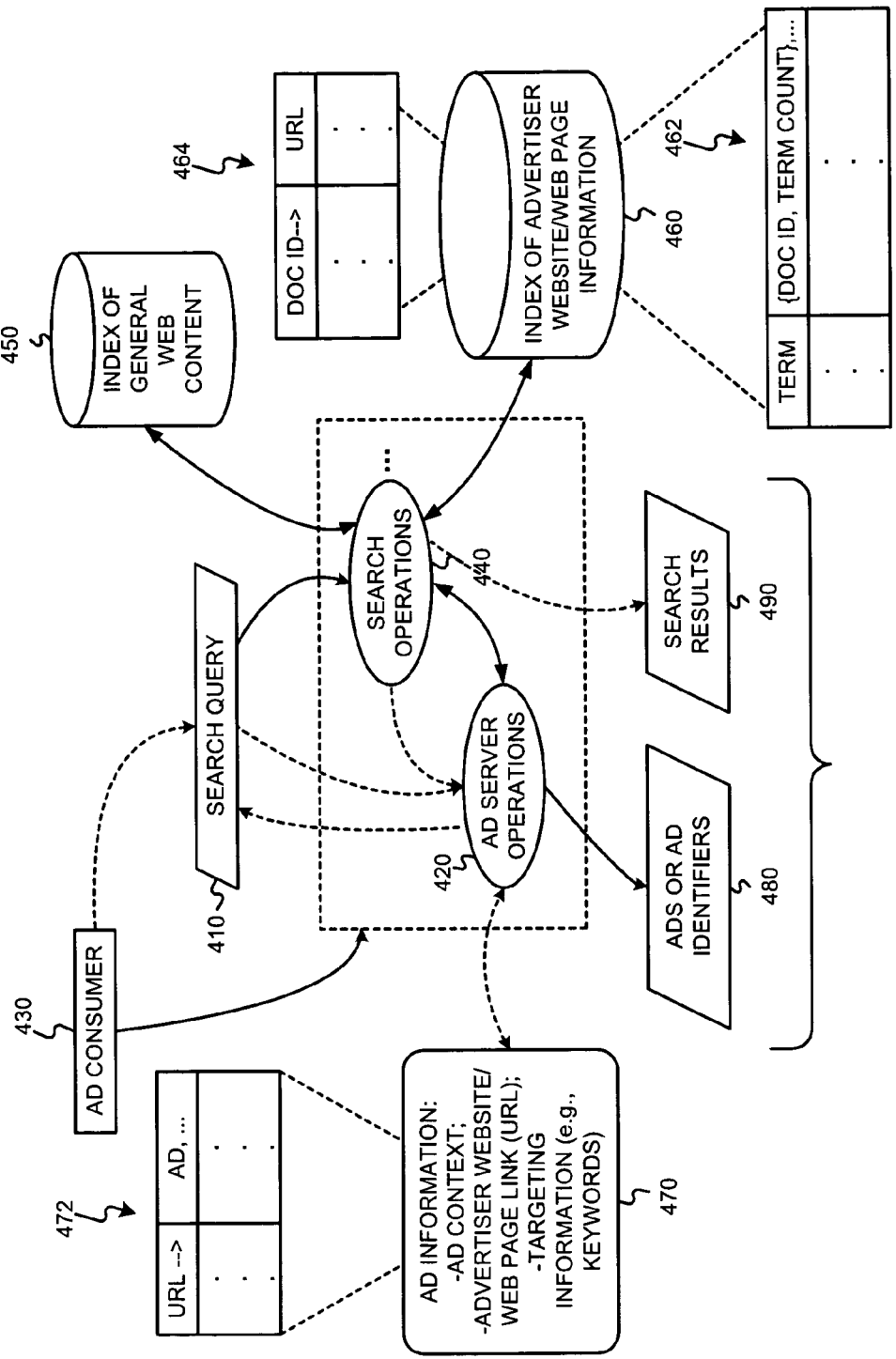
FIG. 4 is a bubble diagram of operations that may be performed, and information that may be generated, used, and/or stored, in a manner consistent with the present invention.

FIG. 4 is a bubble diagram of operations that may be performed, and information that may be generated, used, and/or stored, in a manner consistent with the present invention. Ad server operations 420 may accept a search query 410 (e.g., from an ad consumer 430). Alternatively, the ad server operations 420 may determine information about which a party, such as an ad consumer 430 or a user, is interested. For example, this information might be extracted from an e-mail or a document associated with the party, such as from a subject field, based on information extracted from a document, such as information extracted from certain structured data fields like a title, etc. In one embodiment of the invention, this information may be treated and processed similar to a search query 410.

The ad server operations 420 may then advance the search query 410 (or some derivative thereof) to search operations 440. The search operations 440 search a searchable data-structure. In one embodiment of the present invention, the searchable data-structure may include advertiser Web information (here shown as an inverted index of words and/or phrases extracted from advertiser Websites or Web pages) 460. The search results, which may include an identifier (such as a Website or Web page URL, or some advertiser identifier), are then provided back to the ad server operations. The search results may be scored and/or ordered in some way (e.g., based on an information retrieval ("IR") score and/or a PageRank, etc.).

The ad server operations 420 may use one or more of the search results to obtain one or more ads (or ad identifiers) from stored ad information 470. For example, the advertiser ID or the Website/Web page identifier of each of the one or more search results can be used as a key to lookup one or more ads from ad information 470. Note that although the ad information 470 is shown as including keyword targeting information, such information is not required under the present invention. The ad server operations 420 may use information other than the one or more search results (e.g., geolocation targeting information, temporal targeting information, user information, advertiser information, price information, ad performance information, etc.) to obtain a set of one or more ads (or ad identifiers) from the stored ad information 470. Thus, basis for selecting ads may include a query-independent component and/or a query-dependent component. A query-independent criterion judges the ad (or Website, or Web page) regardless of the actual query. A query-dependent criterion is a score which is determined only with respect to a particular query, such as conventional IR similarity measures.

The ad server operations 420 may then serve at least some 480 of the one or more ads. The ads may be scored and/or ordered using, perhaps among other things, the corresponding search result score or order provided by the search operations 440, though such scoring and/or ordering is not necessary. The score may also reflect the other information just discussed.

In one particular embodiment of the present invention in which targeted ads are to be served in association with search results 490, the search operations 440 (or an instance thereof) may be the ad consumer 430. In this case, the search operations 440 may also search an index of general Web content (e.g., an inverted index of words extracted from crawled Websites) 450. In such an embodiment, search facility infrastructure and technology may be advantageously leveraged to perform both the general content search and the advertiser search.

In the foregoing example, the existence of an index of advertiser Websites/Web page information 460 was assumed. According to one aspect of the present invention, such an index of information corresponding to, or associated with, content owners (e.g. content owners that desire to market their products and or services, such as advertisers) may be generated and/or maintained. Such an index can be generated using, for example, the principles described in S. Brin and L. Page, "The Anatomy of a Large-Scale Hypertextual Search Engine," *Seventh International World Wide Web Conference*, Brisbane, Australia (incorporated herein by reference). In one embodiment, a separate index indexes only content corresponding to or associated with those content owners who have expressed a desire to be associated with a sponsored or paid advertising service (e.g. advertisers who have entered into a paid contractual arrangement with the operator of an advertiser index). The advertiser index may also be generated more generally using well-established search engine principles. Although such principles are well understood by those skilled in the art, they are briefly described for the convenience of less experienced readers.

One goal of general purpose search engines is to index a sizeable portion of the Web. Known search engines typically include three major components—a crawler, an indexer and a query processor. A crawler (also commonly referred to as a "spider" or "robot") collects documents by recursively fetching links from a set of starting pages. The crawler may operate in accordance with policies such as policies concerning which links are followed, how deeply various Web sites are explored, etc. An indexer processes the Web pages collected by the crawler. After the indexer decides which of the collected pages to index (e.g., it might discard duplicate documents), it then builds various data structures representing the Web pages. Most search engines build some variant of an inverted index data structure. The indexer may operate in accordance with policies concerning which words are indexed, capitalization stemming, whether locations within documents are stored, etc. The indexer might also build additional data structures, like a repository to store the original pages, a Web graph representation to store the hyperlinks, a related-pages finder to store related pages, etc. The query processor processes user queries and returns matching answers, in an order determined by a scoring or ranking algorithm. More specifically, the query processor transforms the input into a standard format (e.g. to lower-case terms), uses the index to find the matching documents, and orders (ranks) them.

Referring back to FIG. 4, the index of advertiser Website/Web page information 460 may be generated as follows. A crawler is provided with a list of advertiser Web page URLs (e.g., a Website's home page and/or a landing page, etc.) from ad information 470 to decide which pages to crawl. An indexer can then build all the data structures that will be needed at query time. These may include an inverted index, a URL database, and/or further data structures. In one embodiment, the inverted index contains, for each word, a list of all documents (e.g., Web pages) containing the word, potentially together with the position of the word in the document. This list may be sorted lexicographically. Data structure 462 illustrates an index with terms and associated {document ID, term count} pairs. To save space, documents may be represented by document IDs or advertiser IDs in the index and in other data structures. If this is done, a separate data structure, such as 464, may be used to map a document ID to a Web page identifier such as a URL. As mentioned above, search results including document IDs, Web page IDS, or advertiser IDs can be used as a key to lookup ads (or ad identifiers) in the ad information 470. To simplify this lookup, a data structure, such as 472, associating a Web page ID (e.g., a URL) with an ad or ads may be provided.

Figures 5, 6:
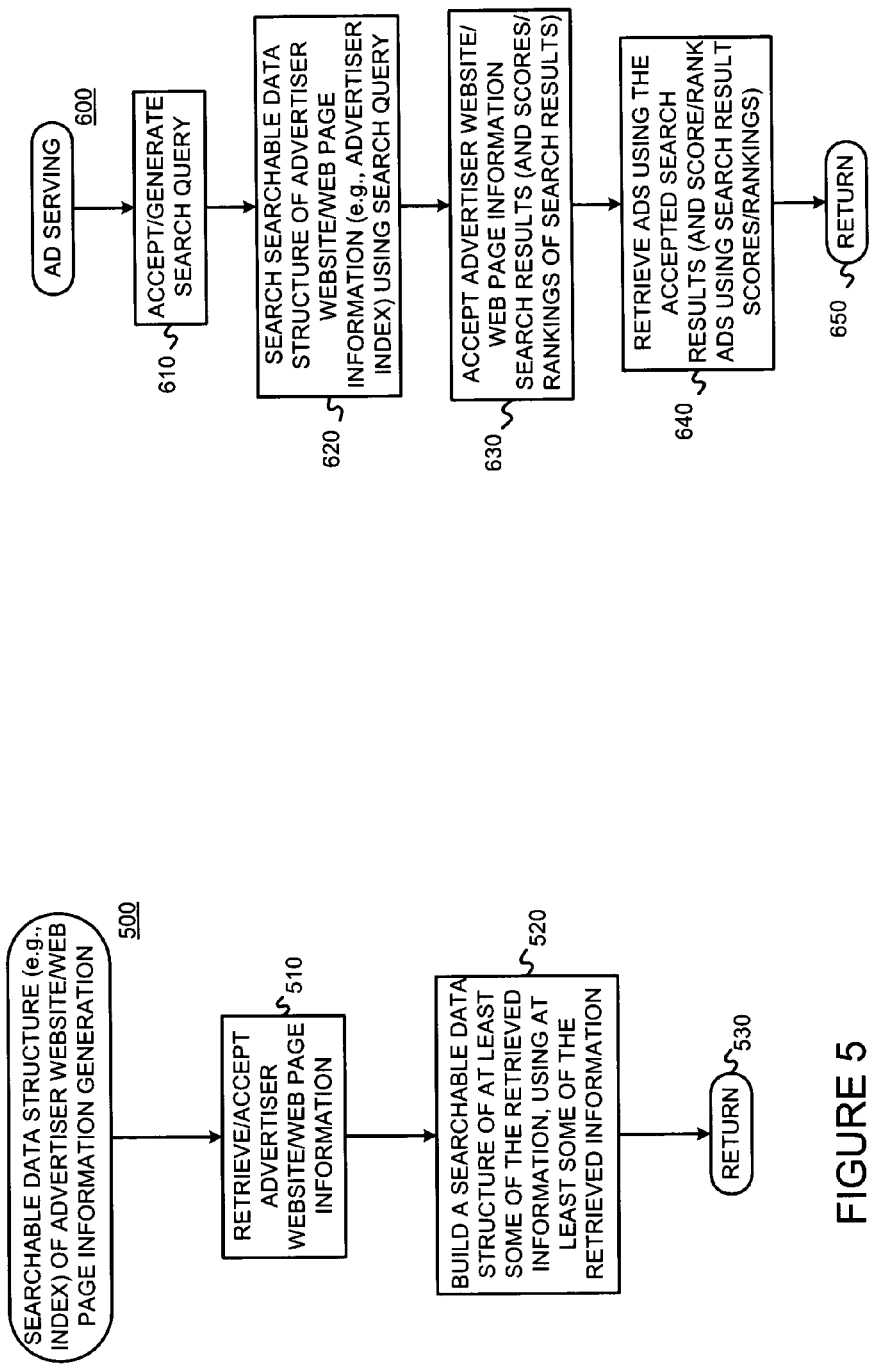
FIG. 5 is a flow diagram of an exemplary method that may be used to generate a searchable data structure of advertiser Web information in a manner consistent with the present invention.
FIG. 6 is a flow diagram of an exemplary method that may be used to serve ads, using at least a searchable data structure of advertiser Web information, in a manner consistent with the present invention.

FIG. 5 is a flow diagram of an exemplary method 500 that may be used to generate a searchable data structure of advertiser information in a manner consistent with the present invention. Advertiser Website/Web page information is accepted or retrieved. (Block 510) Then, a searchable data structure of at least some of the retrieved information is built using at least some of the retrieved information (Block 520) before the method 500 is left (Node 530). Details of exemplary embodiments for performing this method are described in § 4.2.1 below.

FIG. 6 is a flow diagram of an exemplary method 600 that may be used to serve ads, using at least a searchable data structure of advertiser Web information, in a manner consistent with the present invention. A search query is accepted or generated. (Block 610) Then a searchable data structure of advertiser Web information (e.g., a inverted index of terms extracted from advertiser Websites/Web pages) is searched using the search query. (Block 620) Search results (which may include scores and/or rankings) are accepted. (Block 630) Finally, one or more ads are retrieved using, at least, the accepted search results (Block 640), before the method 600 is left (Node 650). The retrieved ads may be ordered and/or scored using the scores and/or rankings of the search results.

§ 4.2.1 Exemplary Techniques for Generating a Searchable Data-Structure of Advertiser Web Page Information Recall from block 510 of FIG. 5 that advertiser Website/Web page information may be retrieved. In one exemplary embodiment of the present invention, this may be performed by (i) obtaining an advertiser Web page URL (which may be the home page of the advertiser Website, or a landing page, etc.) from previously entered and stored ad information (Recall, e.g., 205 of FIGS. 2 and 470 of FIG. 4.), (ii) crawling the advertiser Web page pursuant to some crawl policy (e.g., extract only the home page, extract only the landing page, extract only the home page and the landing page, extract all pages linking to and/or from the home page and/or landing page, extract all pages of the advertiser Website, etc.), and (iii) extracting terms or other information in accordance with some policy.

Recall from block 520 of FIG. 5 that a searchable data structure of at least some of the retrieved information may be built. In one exemplary embodiment of the present invention, known indexing techniques are used to build an inverted index keyed by terms. Each term of the inverted index may include one or more {document ID, term count} pairs. (Recall, e.g., 462 of FIG. 4.) The document ID may be the advertiser Web page URL (of the Website home page, landing page, etc.). Alternatively, the document ID may be a shorter value, with a separate data structure with entries, each entry associating a document ID to a URL. (Recall, e.g., 472 of FIG. 4).

§ 4.2.2 Exemplary Techniques for Serving Ads Using a Searchable Data-Structure of Advertiser Web Information Recall from block 610 of FIG. 6 that a search query may be accepted or generated. If the ads are to be served in association with a search results page, the search query may simply be original search query, or a derivative thereof, submitted by an end user to a search engine. If the ads are to be served in association with a document such as a Web page, the search query may be generated by extracting terms from the Web page. The extracted terms may be from content, and/or from metadata. The extracted terms may be from selective structured data (e.g., terms from a title, and/or from headings, etc.). If the ads are to be served in association with a document such as an e-mail, the search query may be generated by extracting terms from the e-mail. The extracted terms may be from the body of the e-mail, and/or from some structured field (e.g., terms from a "subject" line).

Recall from blocks 620 and 630 of FIG. 6 that a searchable data structure of advertiser Website/Web page information is searched using the search query and the search results are accepted. Recall further that the searchable data structure may be an inverted index. Thus, in one embodiment, a search engine can be used to search an inverted index of information from advertiser Websites/Web pages. If the ads are to be served with a search results page, a search engine can search both an index of general Web content and an index of advertiser Website/Web page information. (Recall, e.g., 450 and 460 of FIG. 4.) The same search engine, or separate instances of the search engine may be used. The index of advertiser Website/Web page information may be included within an index of general Web content. In such a case, the advertiser Web pages should be identified or be distinguishable from general Web content in some way. Thus, the present invention can leverage existing search engine technology and facilities, although this is not necessary.

Finally, recall from block 640 of FIG. 6 that ads may be retrieved using, at least, the accepted search results. In one exemplary embodiment of the present invention, this may be done by using the search result URLs as a key to advertiser information to lookup an associated ad. (Recall, e.g., 472 of FIG. 4.) The ads may be scored and/or ranked using, at least, scores and/or ranks returned by the search of the advertiser Website/Web page information index. Such search result scores and/or ranks may reflect, perhaps among other things, an known information retrieval similarity metric. In addition to being a function of the search result scores, ads may be served, scored and/or ranked using at least one or more of (i) targeting information (including or excluding keywords), (ii) price information (e.g., bids, maximum price bids, etc.), (iii) ad performance information (e.g., clickthrough rate, conversion rate, user ratings, third party ratings, etc.), (iv) advertiser quality information, and/or (v) user information, etc.

§ 4.2.3 Refinements and Alternatives

Although search results of advertiser Website/Web page information may include URLs which may then be used to lookup ads from ad information, other identifiers may be used for this purpose (i.e., to match relevant advertiser Web page information to ads).

Although search results were used to lookup relevant ads, they can be used to lookup relevant ad groups or ad campaigns.

Although keyword targeting need not be provided as ad information, if such information is provided, it can be used in combination with the search result URLs to determine a set of ads to serve. Indeed, some ads can have keyword targeting information, while other ads might not have such keyword targeting information. The present invention can be used to help find relevant ads for which no targeting information is provided, while keyword targeting can be used (with or without the techniques described here) to find relevant ads for which such information is provided.

Although the present invention was described as searching advertiser Web information, other advertiser information can be searched to find relevant advertisers or relevant advertiser information, and therefore relevant ads.

§ 4.2.5 Exemplary Apparatus

Figure 7:
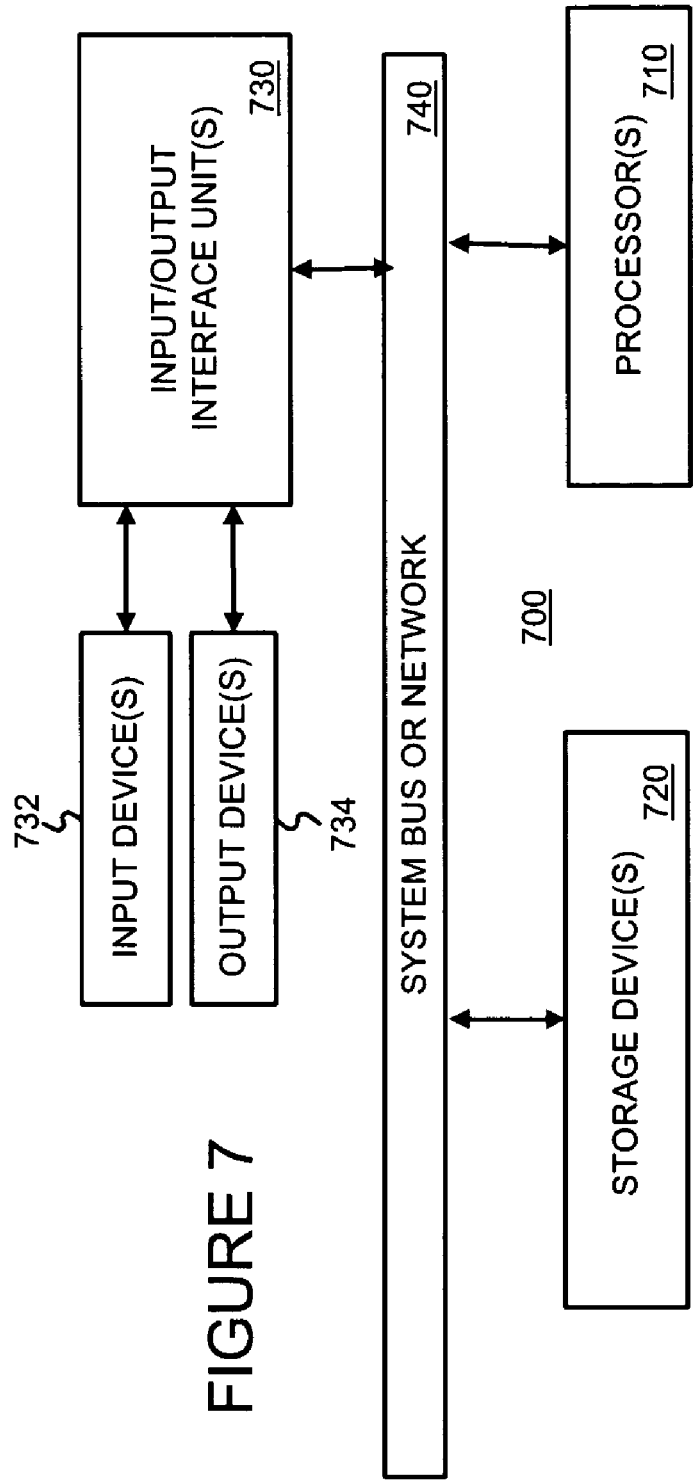
FIG. 7 is a high-level block diagram of apparatus that may be used to perform at least some of the various operations that may be used and store at least some of the information that may be used and/or generated consistent with the present invention.

FIG. 7 is high-level block diagram of a machine 700 that may effect one or more of the operations discussed above. The machine 700 basically includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 720 and/or may be received from an external source via one or more input interface units 730.

In one embodiment, the machine 700 may be one or more conventional personal computers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

The ad server operations and search operations may be performed by, and the various information may be stored on, one or more machines 700.

§ 4.3 Examples of Operations

Figure 8:
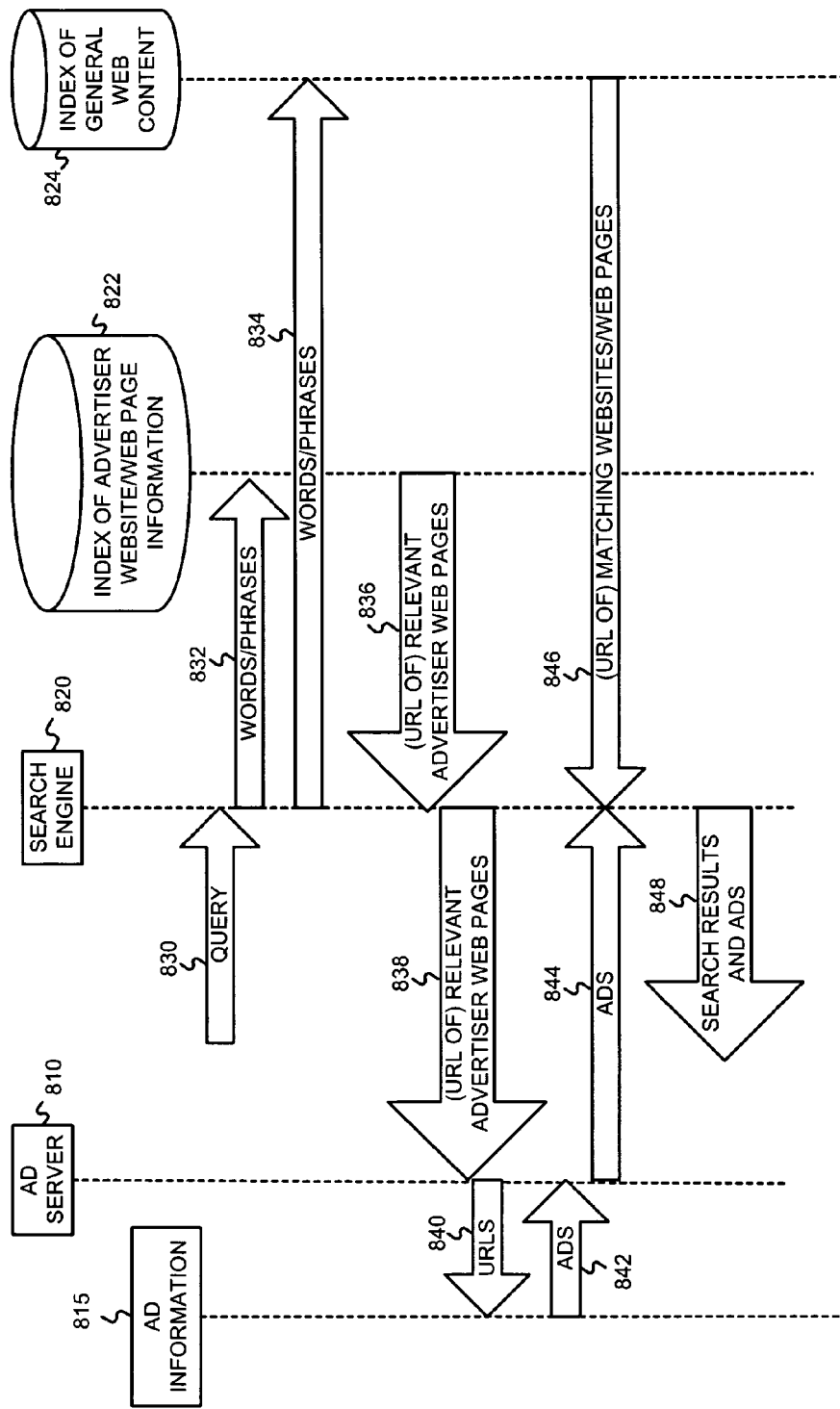
FIG. 8 is a messaging diagram illustrating one way to serve ads, using at least a searchable data structure of advertiser Web information, in a manner consistent with the present invention.

FIG. 8 is a messaging diagram illustrating one way to serve ads, using at least a searchable data structure of advertiser information, in a manner consistent with the present invention. In this particular example, one or more ads are to be served in association with a search results page, and the same search query and search engine are used to generate the search and facilitate the selection of ads. When a query 830 is received by a search engine 820, the search engine uses words and/or phrases 832 to obtain search results 836 using an index of advertiser Website/Web page information 822. The search results 836 may include URLs of relevant (e.g., matching) advertiser Web pages (e.g., a home page of its Website, or a landing page, etc.). The search engine also uses words and/or phrases 834 (which may be the same as, or different from, the words and/or phrases 832) to obtain search results 846 using an index of general content (e.g., many Websites and/or Web pages of the Web) 824. The search results 846 may include the URL and a link of relevant (e.g., matching) Websites and/or Web pages. The search results 846 may also include other information, such as query-relevant snippets from the Website or Web page, a relevance indicator, etc.

The search engine 820 can then forward one or more URLs (or some other Web page identifier) of relevant advertiser Websites and/or Web pages 838 to the ad server 810. The ad server 810 can use at least some of the one or more URLs 840 to lookup ads 842 in ad information 815. The ad server 810 may then return the at least some of the ads 844 to the search engine 820. The ads 844 may include scores or rankings.

The search engine 820 may then serve the search results and ads 848 to the user that submitted the search query 830.

§ 4.4 Conclusions

As can be appreciated from the foregoing disclosure, the present invention can be used to allow advertisers to put targeted ads on, or to serve ads in association with, various content such as search results pages, Web pages, e-mail, etc., without requiring the advertiser to enter and/or maintain certain targeting information, such as keyword targeting. The present invention is particularly useful for determining ads to be served in association with search results pages since indexing, search query, and/or search engine infrastructure and technology can be leveraged. The inventors contemplate that one or more of the foregoing aspects or exemplary embodiments may be used in concert.

What is claimed is:

1. A computer-implemented method comprising:
a) accepting, with a computer system including at least one computer on a network, a search query;
b) searching, with the computer system, using information from the search query, a searchable data structure including advertiser Web page information to generate advertisement search results;
c) accepting, with the computer system, the advertisement search results; and
d) retrieving, with the computer system, automatically, independent of end user acts, and responsive to the search query, at least one advertisement using at least a portion of the accepted advertisement search results,
wherein the at least one advertisement is retrieved from a set of advertiser information, the set of advertiser information including information identifying advertiser Web pages, and
wherein the searchable data structure includes advertiser Web page information that is generated from information automatically extracted exclusively from the identified advertiser Web pages without the need for expressly entered advertiser entered targeting information.

2. A computer-implemented method comprising:
a) accepting, with a computer system including at least one computer on a network, a search query;
b) searching, with the computer system, using information from the search query, a searchable data structure including advertiser Web page information to generate advertisement search results;
c) accepting, with the computer system, the advertisement search results; and
d) retrieving, with the computer system, automatically, independent of end user acts, and responsive to the search query, at least one advertisement using at least a portion of the accepted advertisement search results,
wherein the searchable data structure includes entries, each entry including a term automatically and exclusively extracted from the advertiser Web page information and one or more Web page identifiers, and
wherein the act of retrieving at least one advertisement using at least a portion of the accepted advertisement search results uses Web page identifiers included in the advertisement search results to lookup an advertisement having a landing page corresponding to at least one of the Web page identifiers.

3. The computer-implemented method of claim 2 wherein the searchable data structure is an inverted index.

4. The computer-implemented method of claim 3 wherein the inverted index includes entries, each entry including a term and one or more Web page identifiers.

5. The computer-implemented method of claim 3 wherein the inverted index includes entries, each entry including a term and one or more pairs, each pair including a Web page identifier and a term count.

6. The computer-implemented method of claim 3 wherein the inverted index includes entries, each entry including a term extracted from advertiser Web pages and one or more Web page identifiers that identify advertiser Web pages in which the term appears.

7. The computer-implemented method of claim 2 wherein each of the advertisement search results have a score.

8. The computer-implemented method of claim 7 further comprising:
e) scoring, with the computer system, using at least the advertisement search result scores, at least some of the retrieved at least one advertisement.

9. The computer-implemented method of claim 7 further comprising:
e) scoring, with the computer system, using at least the advertisement search result scores and further using at least one of (1) ad performance information, (2) ad price information (3) advertiser quality information, and (4) user information, at least some of the retrieved at least one advertisement.

10. The computer-implemented method of claim 2 wherein the Web page identifiers are used as lookup keys to a database of advertisement information.

11. The computer-implemented method of claim 2 wherein the at least one advertisement is not one of the accepted search results.

12. A search engine system including at least one computer on a network, the search engine system comprising:
a) a storage facility storing:
1) a first index including information derived from Web pages of the World Wide Web; and
2) a second index including information automatically derived exclusively from Web pages of advertisers without the need for expressly entered advertiser entered targeting information; and
b) a query processor programmed to accept (1) a search query, (2) obtain search results to the search query using the first index, (3) obtain advertisements, automatically, independent of end user acts, and responsive to the search query, using the second index, and (4) output the obtained search results and the obtained advertisements.

13. Apparatus comprising:
a) at least one processor;
b) at least one input device; and
c) a storage facility storing:
1) advertisement information including ads;
2) a searchable data structure including advertiser Web page information generated from information automatically and exclusively extracted from the identified advertiser Web pages without the need for expressly entered advertiser entered targeting information; and
3) processor-executable instructions which, when executed by the at least one processor, perform a method including
i) generating search results using, at least, the searchable data structure, and
ii) providing one or more ads from the advertisement information, automatically, independent of end user acts, and responsive to the search query, using, at least, the generated search results.

14. The apparatus of claim 13 wherein the advertisement information includes records, each record including an ad and an advertiser Web page identifier.

15. The apparatus of claim 14 wherein the advertiser Web-site information included in the searchable data structure is derived from the advertiser Web page identifiers included in records of the advertisement information.

16. The apparatus of claim 13 wherein providing one or more ads from the advertisement information includes
1) determining at least one Web page identifier from the search results, and
2) looking up the one or more ads from the advertisement information using the determined at least one Web page indicator.

17. Apparatus comprising:
a) at least one processor;
b) an input for accepting a search query; and
c) one or more storage devices storing processor-executable instructions which, when executed by one or more processors, perform a method including
1) searching, using information from the search query, a searchable data structure including advertiser Web page information to generate search results, and
2) retrieving, automatically, independent of end user acts, and responsive to the search query, at least one advertisement using at least a portion of the accepted search results,
wherein the at least one advertisement is retrieved from a set of advertiser information, the set of advertiser information including information identifying advertiser Web pages, and
wherein the searchable data structure includes advertiser Web page information that is generated from information automatically extracted exclusively from the identified advertiser Web pages without the need for expressly entered advertiser entered targeting information.

18. The apparatus of claim 17 wherein the searchable data structure is an inverted index.

19. The apparatus of claim 18 wherein the inverted index includes entries, each entry including a term and one or more Web page identifiers.

20. The apparatus of claim 18 wherein the inverted index includes entries, each entry including a term and one or more pairs, each pair including a Web page identifier and a term count.

21. The apparatus of claim 18 wherein the inverted index includes entries, each entry including a term extracted from advertiser Web pages and one or more Web page identifiers that identify advertiser Web pages in which the term appears.

22. The apparatus of claim 17 wherein the at least one advertisement is retrieved from a set of advertiser information, the set of advertiser information including information identifying advertiser Web pages, and
wherein the searchable data structure including advertiser Web page information includes information extracted exclusively from the identified advertiser Web pages.

23. The apparatus of claim 17 wherein each of the search results have a score.

24. The apparatus of claim 23 wherein the method further includes
3) scoring, using at least the search result scores, at least some of the retrieved at least one advertisement.

25. The apparatus of claim 23 wherein the method further includes
3) scoring, using at least the search result scores and further using at least one of (i) ad performance information, (ii) ad price information (iii) advertiser quality information, and (iv) user information, at least some of the retrieved at least one advertisement.

26. The apparatus of claim 17 wherein the searchable data structure includes entries, each entry including a term and one or more Web page identifiers, and
wherein retrieving at least one advertisement using at least a portion of the accepted search results uses Web page identifiers included in the search results.

27. The apparatus of claim 26 wherein the Web page identifiers are used as lookup keys to a database of advertisement information.

28. The apparatus of claim 17 wherein the at least one advertisement is not one of the accepted search results.

29. The apparatus of claim 17 wherein retrieving at least one advertisement does not consider expressly entered targeting information.

30. The apparatus of claims 17 wherein retrieving at least one advertisement does not consider keyword targeting information.

31. The apparatus of claim 17 wherein the method further includes
3) generating a document including (i) search results determined using the search query and a second searchable data structure, and (ii) the at least one advertisement.

32. The apparatus of claim 31 wherein a format of each of the search results is different from a format of each of the at least one advertisement.

* * * * *

UNITED STATES PATENT AND TRADEMARK OFFICE
CERTIFICATE OF CORRECTION

PATENT NO. : 7,647,299 B2  Page 1 of 1
APPLICATION NO. : 10/614736
DATED : January 12, 2010
INVENTOR(S) : Georges R. Harik It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Twenty-eighth Day of December, 2010

David J. Kappos
*Director of the United States Patent and Trademark Office*